Patented Apr. 26, 1949

2,468,507

UNITED STATES PATENT OFFICE 2,468,507

MANUFACTURE OF SAFETY FUEL

Frank J. Moore, Wappingers Falls, and Ernest F. Pevere, Beacon, N. Y., assignors to The Texas Company, New York, N. Y., a corporation of Delaware No Drawing. Application July 16, 1946, Serial No. 683,992

1 Claim. (Cl. 260—683.15)

This invention relates to the manufacture of safety fuel.

In accordance with the invention a hydrocarbon mixture containing $C_4$ olefins and paraffins is treated to separate therefrom a $C_4$ fraction substantially free from normal butane and butylene-2. The resulting $C_4$ fraction is treated with sulfuric acid under polymerizing conditions to produce a polymer product which can be separately treated with hydrogen to produce a satisfactory safety fuel.

More specifically the invention contemplates separating normal butane and butylene-2 from a $C_4$ mixture comprising isobutane, isobutylene, butylene-1, butylene-2 and normal butane and treating the residual $C_4$ mixture substantially free from normal butane and butylene-2 with sulfuric acid containing about 75 to 85% $H_2SO_4$, at an elevated temperature, for example about 140° F., so as to effect polymerization thereby producing a polymer product boiling in the range about 300 to 400° F. and suitable, when hydrogenated, as safety fuel.

We have discovered that an unexpectedly large improvement in the yield of the desired polymer product is realized by effecting the polymerization of the $C_4$ feed in the substantial absence of butylene-2 and normal butane. In addition we have discovered that improved results are obtained by employing as a polymerization catalyst sulfuric acid containing about 75 to 85% $H_2SO_4$ and preferably about 80% $H_2SO_4$.

The following examples demonstrate the improvement in yield when effecting the polymerization in the absence of normal butane and butylene-2:

| Run No | A | B |
|---|---|---|
| Charge Stock | | |
| Composition, weight percent: | | |
| Isobutane | 13.0 | 50.0 |
| Isobutylene | 14.0 | 33.3 |
| Butylene-1 | 7.0 | 16.7 |
| Butylene-2 | 21.0 | |
| n-Butane | 45.0 | |
| Operating Conditions | | |
| Acid Conc., percent $H_2SO_4$ | 80 | 80 |
| Temperature, °F | 140 | 140 |
| Pressure, p. s. i. | 200 | 200 |
| Contact Time, Min | 26 | 25 |
| Olefin Space Velocity (liquid volumes of olefin per volume of catalyst per hour) | 0.94 | 1.28 |
| Yields | | |
| Weight percent olefin Conversion | 53.0 | 102 |
| Volume percent Safety Fuel Polym | 18.2 | 50.2 |

In the foregoing polymerizations the feed hydrocarbon was charged continuously with continuous withdrawal of reaction mixture. The withdrawn mixture is separated into a hydrocarbon phase and an acid phase, the latter phase being recycled to the polymerization reaction. The hydrocarbon phase is removed and fractionated to segregate a safety fuel polymer fraction boiling in the range 300 to 400° F.

In any case it will be seen that in run B the yield of safety fuel polymer was 50.2% as compared with only 18.2% in the case of run A.

When the feed stock such as that used in run B is polymerized with acid containing 85% $H_2SO_4$, under the same reaction conditions, the yield of safety fuel polymer declines to about 46.6%. Likewise when the catalyst contains only 70% $H_2SO_4$, the yield of safety fuel polymer declines to 26.4%. From this it is apparent that the best results are obtained with a catalyst containing about 80% $H_2SO_4$.

While the foregoing experiments were run at a temperature of about 140° F. it is contemplated that the temperature may vary somewhat from this, for example, within the range about 120 to 140° F. Likewise the pressure may be within the range 100 to 150 pounds per square inch gauge.

As already indicated, the polymer product is subjected to fractionation to separate a safety fuel polymer fraction of desired boiling range, i. e., 300 to 400° F. Polymer hydrocarbons boiling below 300° F. as well as those boiling above 400° F. may be recycled to the polymerization reaction. The fraction of the polymer product desired for safety fuel manufacture may be hydrogenated in conventional manner employing for example temperatures ranging from about 200 to 700 or 800° F. in the presence of a suitable hydrogenation catalyst.

Obviously many modifications and variations of the invention as above set forth may be made without departing from the spirit and scope thereof, and therefore only such limitations should be imposed as are indicated in the appended claim.

We claim:

In the continuous method of manufacturing safety fuel from a $C_4$ hydrocarbon mixture containing butylenes, isobutylene and normal butane, the steps which comprise removing butylene-2 and normal butane from said mixture, continuously passing resulting residual $C_4$ mixture substantially free from butylene-2 and normal butane to a polymerization reaction zone containing a polymerization catalyst consisting of sulphuric acid containing about 80% $H_2SO_4$, effecting contact between olefins and said catalyst in the reaction zone at a temperature of about 140° F., and with an olefin space velocity of approximately 1 liquid volume of olefin per volume of catalyst per hour such that there is substantially complete conversion of olefin charged to the reaction zone, and continuously withdrawing from the reaction zone resulting polymer product containing a large proportion of hydrocarbons boiling within the range 300 to 400° F.

FRANK J. MOORE.
ERNEST F. PEVERE.

REFERENCES CITED

The following references are of record in the file of this patent:

UNITED STATES PATENTS

| Number | Name | Date |
|---|---|---|
| 2,171,250 | Archibald | Aug. 29, 1939 |
| 2,181,640 | Deanesly et al. | Nov. 28, 1939 |
| 2,348,017 | Miller | May 2, 1944 |